Patented Mar. 22, 1938

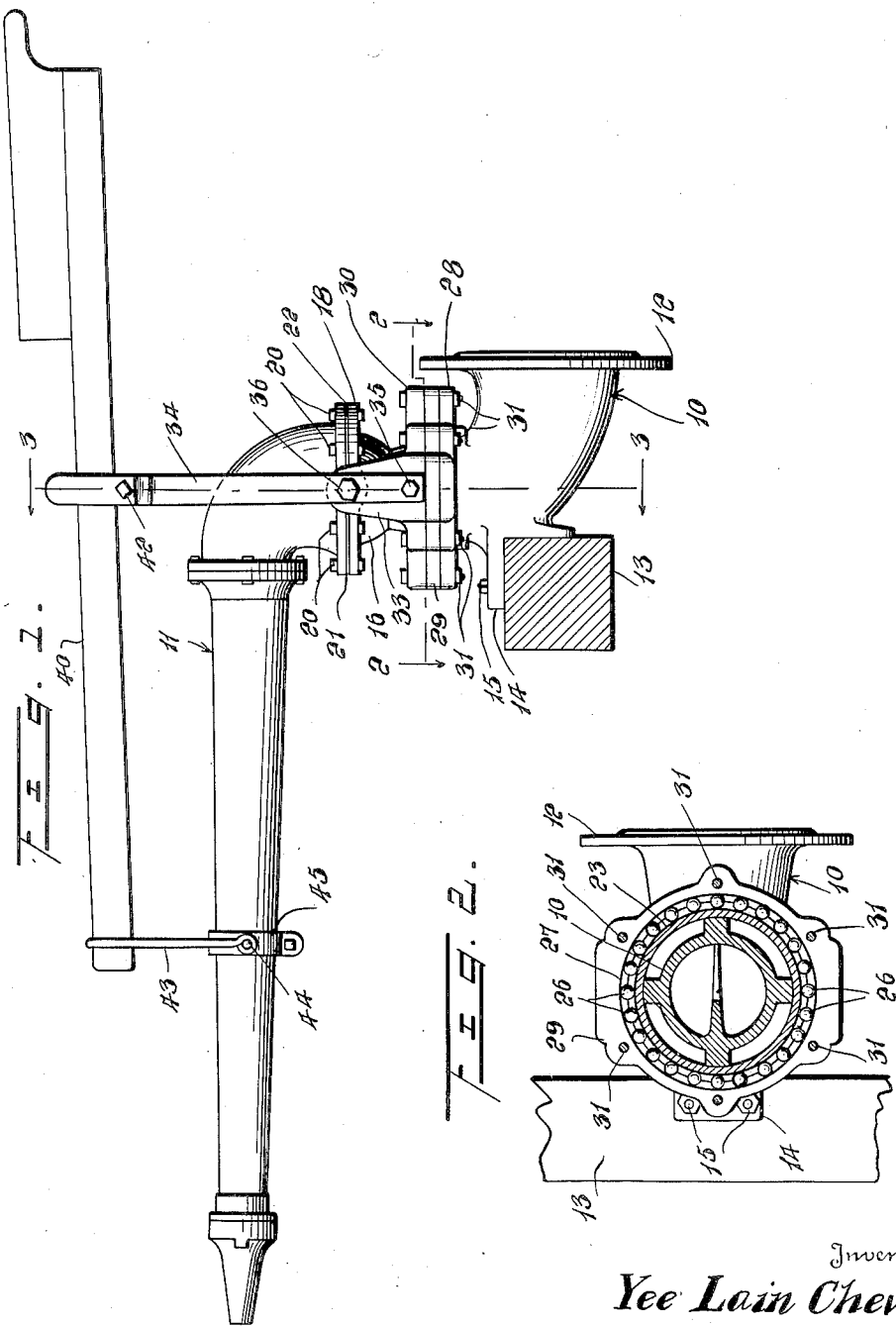

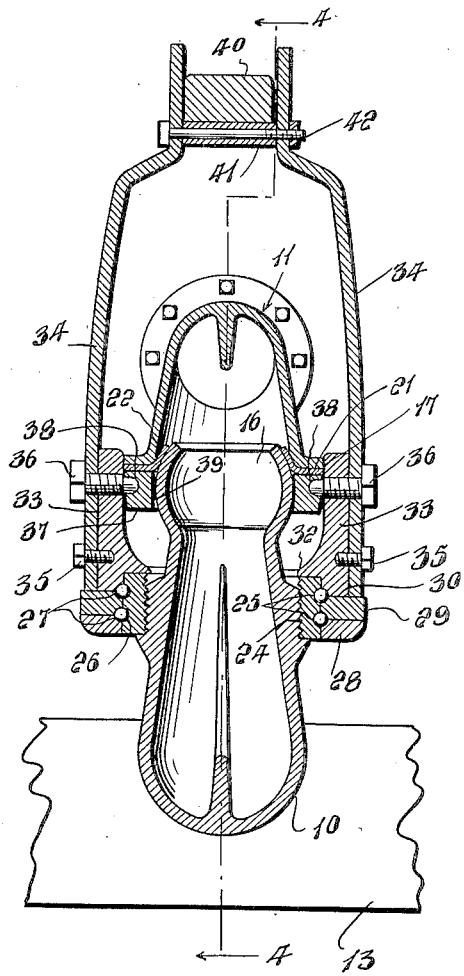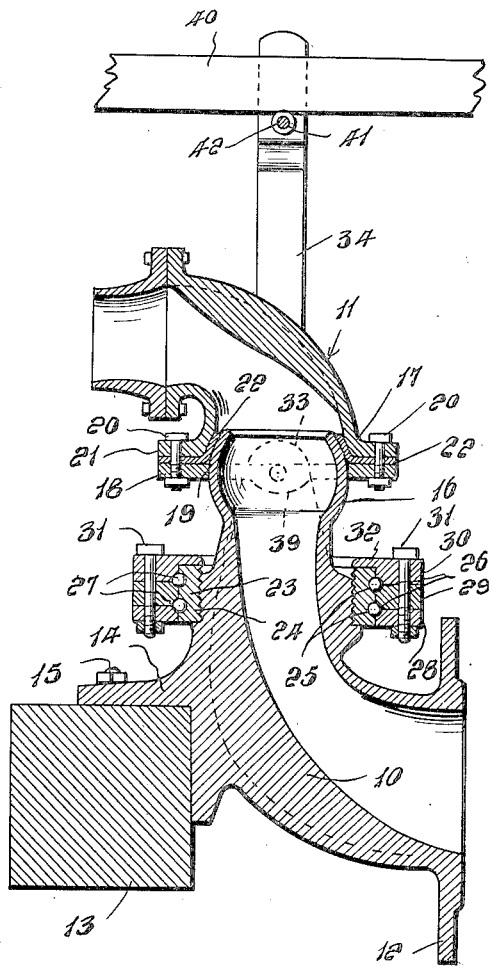

2,111,553

UNITED STATES PATENT OFFICE 2,111,553

MINING MONITOR OR NOZZLE

Yee Lain Chew, Gopeng, Federated Malay States

Application October 15, 1936, Serial No. 105,784

4 Claims. (Cl. 299—73)

This invention relates to a monitor or mining nozzle of the type used in connection with high pressure water supply.

It is generally aimed to provide a novel construction wherein the movable section is supported on bearings apart from the joint of the fixed section, in order to minimize wear and tear of the joint and consequent leakage and facilitate operation of the movable section. The invention has the material advantage that the lubricant will not be washed out by the high pressure water, at the joint, and will not be fouled by the ingress of grit in the water, and will consequently be capable of maintenance in efficient condition, amply lubricated, and require minimum attention.

The more specific objects and advantages will become apparent from a consideration of the description following taken in connection with accompanying drawings illustrating an operative embodiment.

In said drawings:—

Figure 1 is a view of the improvement in side elevation;

Figure 2 is a horizontal sectional view taken on the line 2—2 of Figure 1;

Figure 3 is a vertical sectional view taken on the line 3—3 of Figure 1, and

Figure 4 is a vertical sectional view taken on the plane of line 4—4 of Figure 3.

Referring specifically to the drawings wherein like reference characters designate like or similar parts, the improved nozzle has a fixed and supporting section 10 and a movable section 11, both sections being hollow as shown, for the passage of water therethrough under high pressure. Section 10 is connected with the source of supply in any suitable manner as by means of a flange 12 and it is anchored to any suitable rigid support as at 13, a section being shaped to intimately fit a portion of such support as at 14 and being detachably bolted or otherwise connected thereto as at 15.

At the top or outlet end of the section 10, it is bulged and exteriorly spherical as at 16. Such portion 16 or ball is externally engaged by a correspondingly shaped portion 17, in combination with a plate 18 in the form of a ring having an inner annular surface 19, conforming to the exterior of the spherical surface 16. Plate 18 is detachably bolted as at 20 to a flange 21 at the base of the upper or outlet section 11. Said bolts 20 secure a gasket 22 in place between the plate 18 and flange 21 and between the portion 17 and surface 16 to provide a fluid tight joint. Such gasket may be made of any desired flexible material and for instance leather. Because of this construction, a substantially universal joint is produced.

According to the invention, the upper or movable section 11 is supported on bearings apart from such substantially universal joint to minimize wear, tear, leakage and in order that it will maintain lubricant without danger of it being washed or blown away by the force of the high pressure water passing through the nozzle. To this end, the section 10 below the ball 16 has a race member or ring 23 screw threaded thereto as at 24 and the race member has one or more grooves 25 peripherally thereof in which ball bearings or the equivalent 26 are disposed.

Such ball bearings 26 are engaged also in grooves 27 of adjacent race members 28, 29 and 30, all separable and secured together by means of bolts 31.

Said upper race member 30 has an inwardly extending annular flange at 32 which overlaps the ring or race member 23 and at diametrically opposite points, has integral upwardly extending ears as at 33. Upright bracket arms 34 are detachably fastened as by means of screws 35 to the ears 33. Screws 36 pass through the arms 34 and ears 33, being screw threaded to both of them, and having semi-spherical plain inner end portions 37 loosely engaged in similarly shaped sockets 38 provided in enlarged portions 39 of the plate 18. It will be realized, that the race members 28, 29 and 30, upper section 11 and bracket members 34 are rotatable about a vertical axis on the bearings 26.

In order to operate the section 11 of the substantially universal joint provided by the portion 16 and associated parts, a lever 40 is provided which rests on a roller 41 journaled on a bolt 42, spanning the bracket members 34 at their upper ends. At the forward end, the lever 40 extends loosely through a yoke or vail 43 which is pivoted at 44 to a clamping ring or the like 45, clamped rigidly about the outlet or upper section 11.

Various changes may be resorted to provided they fall within the spirit and scope of the invention.

I claim as my invention:—

1. In a nozzle construction of the class described, a lower nozzle section, an upper nozzle section, means providing a swivel joint between said sections, bearing means swiveled on the lower nozzle section apart from the first mentioned means, means supporting the upper nozzle section on said bearing means, a lever connected to the upper nozzle section, and means mounting said lever on said third mentioned means.

2. In a nozzle construction of the class described, a lower nozzle section, an upper nozzle section, means providing a swivel joint between said sections, bearing means swiveled on the lower nozzle section apart from the first mentioned means, means supporting the upper nozzle section on said bearing means, a lever connected to the upper nozzle section, and means mounting said lever on said third mentioned means, said first mentioned means including a plate and supporting means having elements pivotally engaged with said plate.

3. In a nozzle construction of the class described, a lower nozzle section, an upper nozzle section, means providing a swivel joint between said sections, bearing means swiveled on the lower nozzle section apart from the first mentioned means, a lever connected to the upper nozzle section, and means mounting said lever on said bearing means, said bearing means comprising a ring attached to the lower nozzle section, race members secured together and disposed about said ring, the uppermost race member having a flange supported on the upper end of said ring.

4. A nozzle construction of the class described comprising a lower nozzle section, an upper nozzle section, a ball and socket joint between the sections, said joint including a gasket and a plate having sockets, a ring screw threaded on the lower nozzle section below said joint, bearing means engaging the ring including an inwardly extending flange supported on the ring, ears rising from said bearing means, bracket arms secured to the ears and including fastenings having pivotal engagement with said sockets, and lever means operatively mounted by said arms and connected to said upper nozzle section.

YEE LAIN CHEW.